United States Patent [19]
Schneider et al.

[11] Patent Number: 5,597,489
[45] Date of Patent: Jan. 28, 1997

[54] METHOD FOR REMOVING CONTAMINANTS FROM WATER

[75] Inventors: H. Michael Schneider, Atherton; Edward Allen, Pleasanton; Richard Woodling, Redwood Estates; Roy Barnes, Union City, all of Calif.

[73] Assignee: Sepragen Corporation, Hayward, Calif.

[21] Appl. No.: 399,169

[22] Filed: Mar. 2, 1995

[51] Int. Cl.⁶ .................................................. C02F 1/42
[52] U.S. Cl. .......................................... 210/670; 210/688
[58] Field of Search .......................... 210/660, 670, 210/792, 807, 266, 269, 283, 285, 286, 688

[56] References Cited

U.S. PATENT DOCUMENTS

| | | | |
|---|---|---|---|
| 1,993,142 | 3/1935 | Johnson | 210/283 |
| 3,056,502 | 10/1962 | Zwicky | 210/283 |
| 4,021,339 | 5/1977 | Foody | 210/807 |
| 4,110,081 | 8/1978 | Millar et al. | 210/269 |

*Primary Examiner*—Ivars Cintins
*Attorney, Agent, or Firm*—Medlen & Carroll

[57] ABSTRACT

Contaminants in ground water, waste water and industrial effluents are removed using a contaminant removing media packed in a radial flow column. The radial flow column includes a fluid chamber having cylindrical inner and outer screens positioned therein. A contaminant removing media is packed in a media bed between the inner and outer screens. Contaminated water is passed through the column with the water passing through the outer screen, the contaminant removing media and out the inner screen. The contaminant removing media preferably has a size in a range between 50–400 mesh and more preferably between 150–400 mesh.

27 Claims, 11 Drawing Sheets

METHOD FOR REMOVING CONTAMINANTS FROM WATER

BACKGROUND OF THE INVENTION

The invention relates to a method and apparatus for water treatment. The water treatment method and apparatus of the present invention may be used for treating water from any source and is particularly suited for treating industrial effluents and contaminated groundwater. Federal and state governments have promulgated statutes which impose severe civil and criminal penalties for discharging contaminants into the environment. To comply with the statutes, many industrial effluents must be treated to remove various contaminants. When a contaminant has been released onto land, remediation often requires extracting and treating the contaminated ground water.

A known method of treating water is with a contaminant removing media packed into an axial flow column. The contaminant removing media forms a porous matrix through which the contaminated water flows. As the contaminated water passes through the contaminant removing media, contaminants in the water are removed. The contaminant removing media may extract contaminants in a number of different ways including absorption, adsorption, ion exchange, affinity, hydrophilic interactions, hydrophobic interactions and other mechanisms known to those having skill in the art.

Axial flow columns are generally cylindrical and include an inlet at one end of the cylindrical column and an outlet at the other end of the column. When axial flow columns are scaled up for commercial purposes, larger columns are required. A typical commercial axial flow column can be as large as 20 feet high with a diameter of about 10 feet.

A problem which occurs when increasing the throughput of an axial flow column is that the combination of high flow rate and large bed height results in a high pressure drop across the media. The high pressure drop compresses the media which adversely affects the flow pattern through the column. Compression of the media contributes to channeling which greatly reduces the efficiency of the axial flow column.

An object of the present invention is to provide an improved system for removing contaminants from water using contaminant removing media. Another object of the present invention is to identify appropriate contaminant removing media to be used with the preferred contaminant removing system.

SUMMARY OF THE INVENTION

To achieve the foregoing and other objects, the present invention provides a radial flow column for water treatment which does not suffer the problems associated with axial flow columns. The radial flow column provides a larger flow area with a shorter flow length than axial flow columns of comparable throughput. The smaller flow length results in lower pressure drops and reduced media compression and channeling.

The contaminant removing media may be any type of contaminant removing media. Examples of suitable contaminant removing media include peat moss, algae, redwood bark, ion exchange media including cationic, anionic and chelating resins, as well as adsorbents and absorbents such as granulated activated carbon and polymeric agents.

In another aspect of the invention, the contaminant removing media preferably has a size in a range from 50–400 mesh and more preferably between 150–400 mesh. As will be described in greater detail below, the size of the contaminant removing media enhances the performance of the column in an unexpected manner.

Other features and advantages of the invention will appear from the following description in which the preferred embodiment has been set forth in detail in conjunction with the accompanying drawings.

DESCRIPTION OF THE PREFERRED EMBODIMENTS

1. Radial Flow Column for Water Treatment

Figure 1:
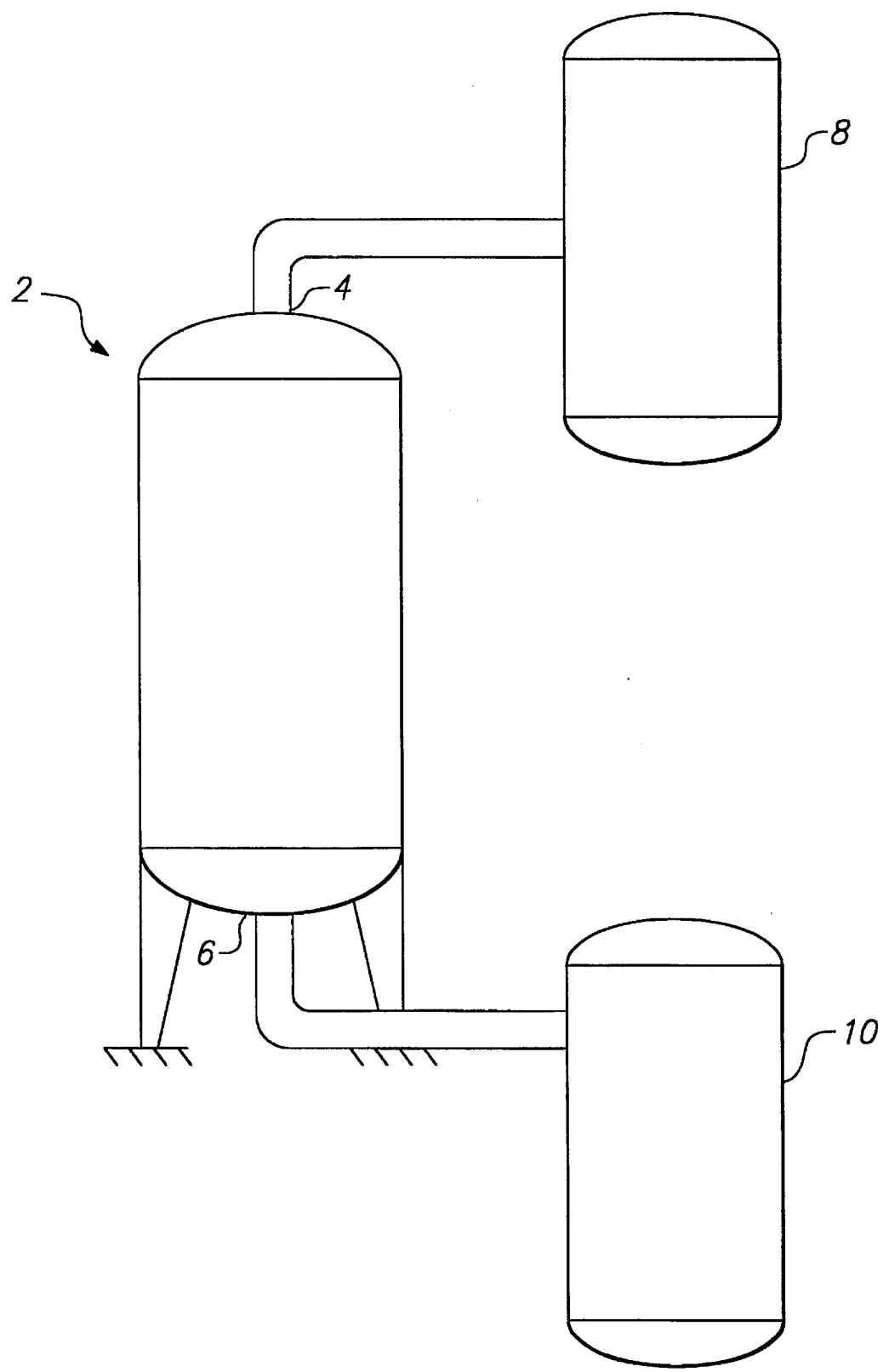
FIG. 1 shows a radial flow column having an inlet coupled to a source of contaminated water and an output coupled to a receiving tank.

Referring to FIG. 1, a radial flow column 2 is shown which includes an inlet 4 and an outlet 6. The inlet 4 is coupled to a source of contaminated/untreated water 8, such as a tank or industrial discharge pipe, and the outlet 6 is coupled to a receiving tank 10 which receives the treated water. As used herein, the term "contaminated water" refers to water having any amount of undesirable contaminants and may be used on water which may be considered pure or ultrapure. The contaminated water preferably has a contaminant concentration of less than 10,000 ppm, more preferably less than 1000 ppm, and most preferably less than 100 ppm.

Figure 2:
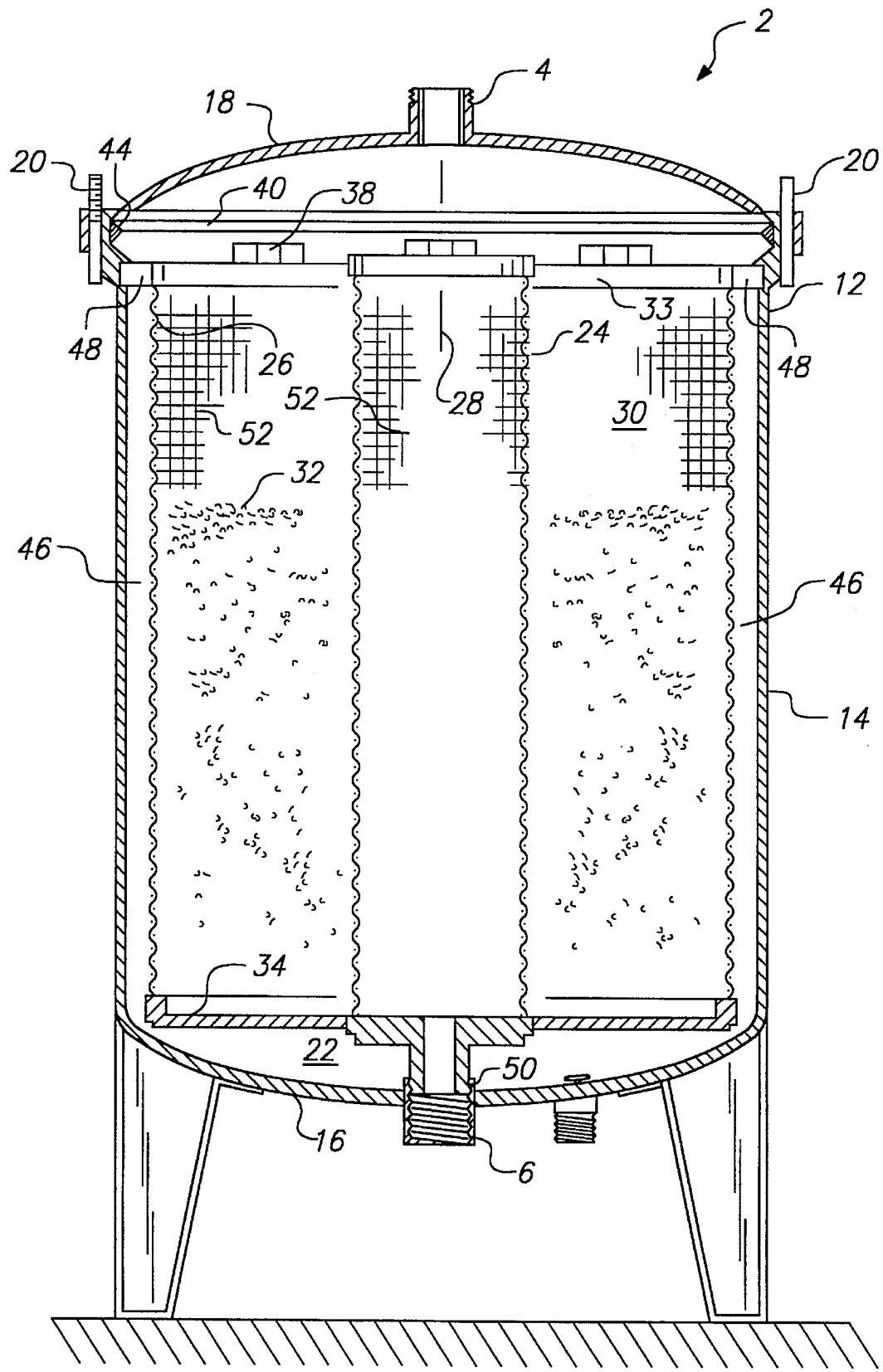
FIG. 2 is a cross-sectional view of the radial flow column of FIG. 1 showing a contaminant removing media contained in a media bed between inner and outer screens.

Referring to FIG. 2, the radial flow column 2 of the present invention includes a body 12 having a sidewall 14 and a bottom 16. A top 18 is removably attached to the body 12 of the radial flow column 2 with a number of bolts 20.

The interior of the radial flow column 2 defines a fluid chamber 22 in which are positioned an inner screen 24 and an outer screen 26. The inner and outer screens 24, 26 are preferably cylindrical and have a common longitudinal axis 28. The space between the inner and outer screens 24, 26 defines a compartment 30 into which a contaminant removing media 32 is loaded. The contaminant removing media 32 preferably fills the compartment 30 and is shown in FIG. 2 as partially filling the compartment 30 for clarity. The components of the radial flow column 2 are made of a material suited for the particular water treatment system and a preferred material is 304 stainless steel. Other materials may be supplemented as needed depending upon the particular application.

Figure 3:
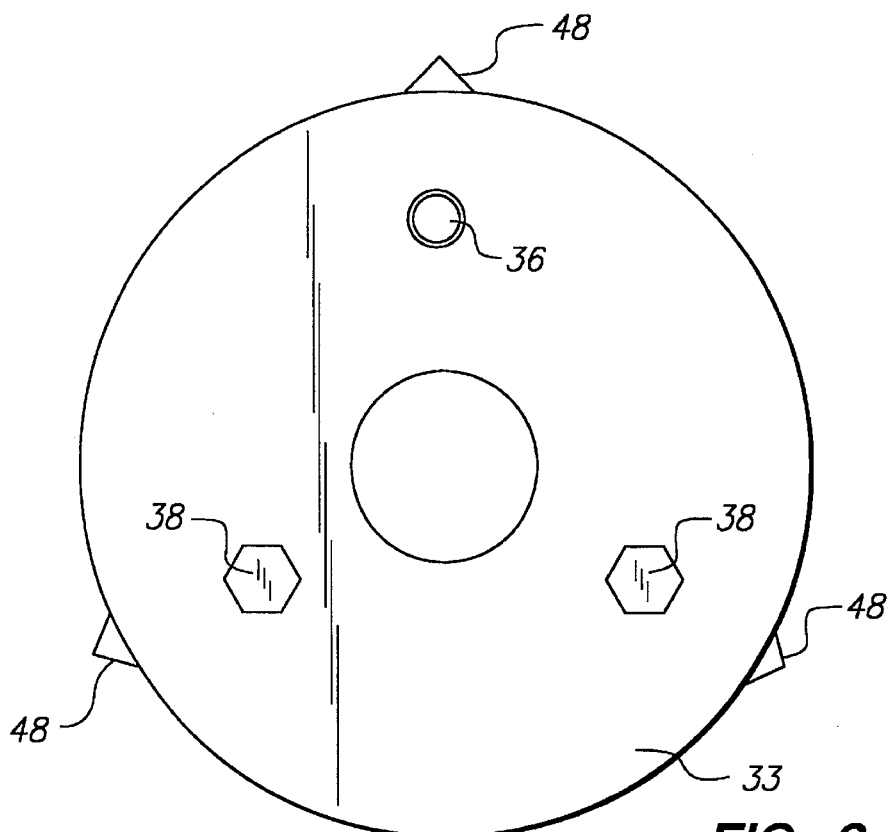
FIG. 3 is a plan view of a top plate having feed ports for loading the contaminant removing media into the media bed.

A top plate 33 and a bottom plate 34 enclose both ends of the inner and outer screens 24, 26. The top and bottom plates 33, 34 are fluid tight so that the water to be treated must travel through the cylindrical outer screen 26, into the media bed 30 and through the inner screen 24. Referring to FIG. 3, the top plate 33 has three feed ports 36, one of which is shown, which are sealed by threaded covers 38. The covers 38 are removed for loading the contaminant removing media 32 into the media bed 30 through the ports 36.

Figure 4:
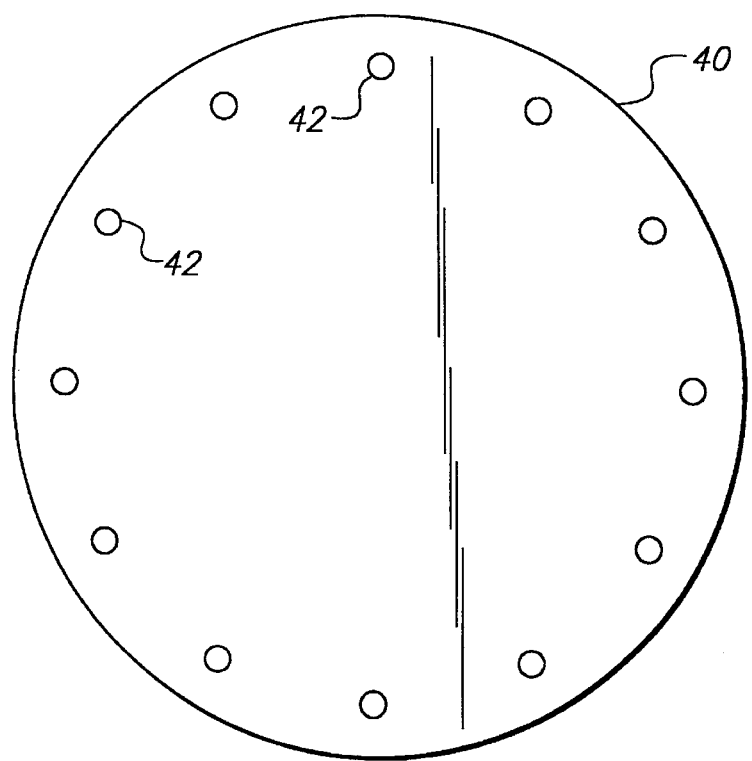
FIG. 4 is a plan view of a distribution plate.

Referring again to FIG. 2, contaminated water enters the fluid chamber 22 through the inlet 4 and is distributed by a distribution plate 40. Referring to FIG. 4 which shows a plan view of the distribution plate 40, the distribution plate 40 has a number of apertures 42 distributed near the outer circumference. The apertures 42 distribute the contaminated water to promote a uniform flow around the circumference of the distribution plate 40. Although it is preferred to provide the distribution plate 40, the radial flow column 2 may also include other flow enhancing or distributing features such as baffles or flow distribution devices. A gasket 44 forms a fluid tight seal between the distribution plate 40 and the body 12 of the radial flow column 2.

The outer screen 26 is spaced apart from the sidewall 14 so that a feed channel 46 is formed between the outer screen 26 and sidewall 14. Spacers 48 ensure that the distance between the sidewall 14 and outer screen 26 is substantially the same on all sides. Referring to the plan view of FIG. 3, the spacers 48 are preferably V-shaped. The inner and outer screens 24, 26 are coupled together to form an integral unit and are mechanically connected to the body 12 of the radial flow column 2. The inner and outer screens 24, 26 may be mechanically connected to the body 12 in any manner but are preferably coupled to the body 12 by a threaded connection 50 at the outlet 6.

Figure 5:
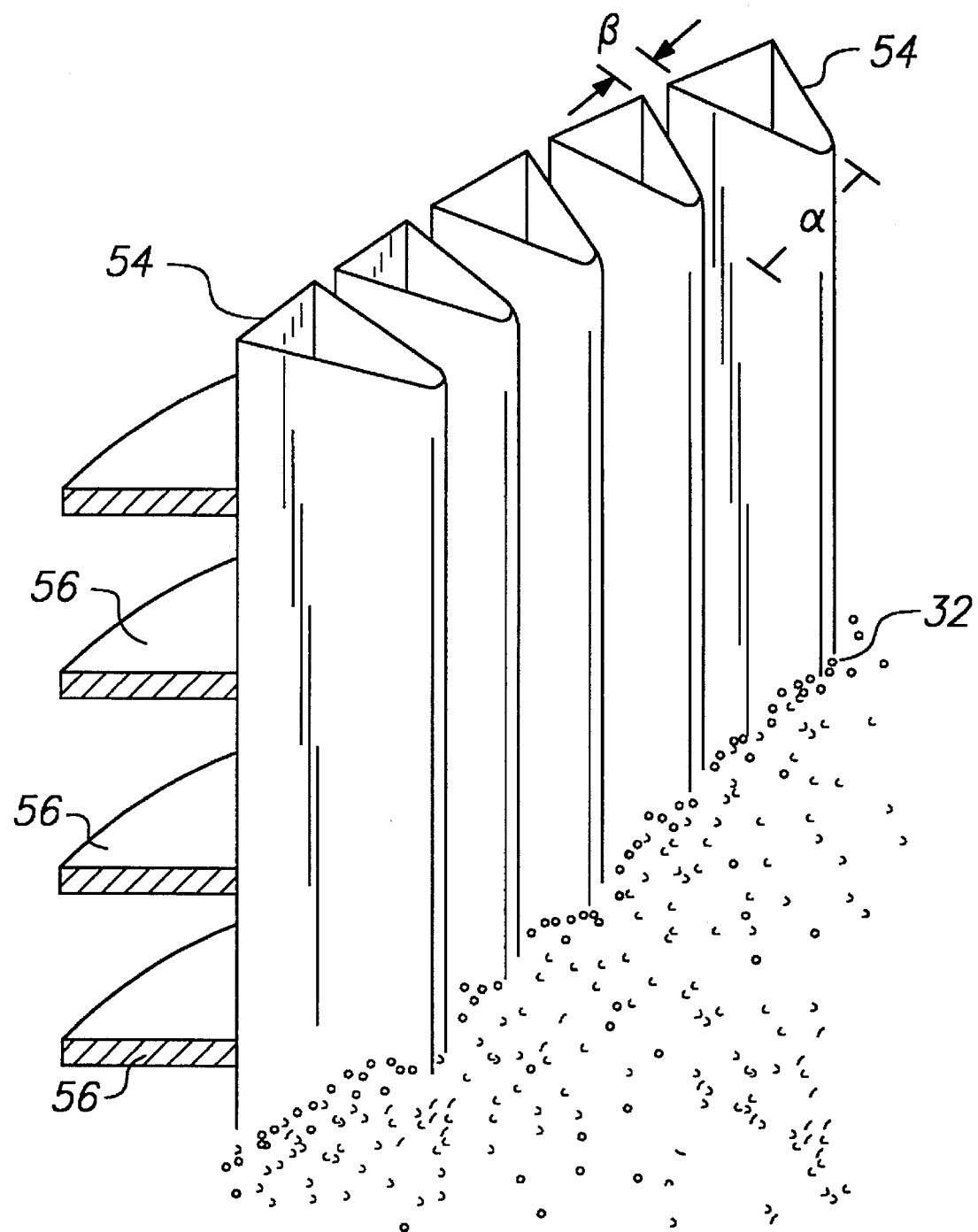
FIG. 5 is an enlarged cross-sectional view of the outer screen.

The inner and outer screens 24, 26 include openings 52 so that the water may pass therethrough. The inner and outer screens 24, 26 may be formed in any manner so long as the openings 52 are small enough to retain the preferred size of contaminant removing media 32 described below. It is understood that any type of screen may be used and that the preferred screens 24, 26 are merely an example. Referring to FIG. 5, a preferred outer screen 26 includes a number of longitudinally-extending members 54. The members 54 have a generally triangular-shaped cross-section in a plane transverse to the longitudinal axis 28. Ribs 56 run circumferentially around the members 54 and reinforce the members 54 so that the spacing between adjacent members 54 is maintained. Adjacent members have a radially-outward separation β which is preferably smaller than a radially-inward separation α. The radially-outward separation β is preferably sized between 50 and 400 mesh and more preferably between 150 and 250 mesh. The radially-outward separation β is small enough to retain the preferred size of contaminant removing media 32 while large enough so that the flow is not overly impeded.

Operation of the radial flow column 2 is now described. Contaminated water enters the radial flow column 2 through the inlet 4 and flows into an area above the distribution plate 40. The distribution plate 40 distributes the water downwardly into the feed channel 46. The contaminated water then passes through the outer screen 26, through the contaminant removing media 32 where contaminants are removed, through the inner screen 24 and out the outlet 6. After the radial flow column has been used for a period of time, the contaminant removing media may be regenerated by passing a suitable regenerating fluid through the radial flow column. Alternatively, the contaminant removing media may be replaced.

The radial flow column 2 of the present invention provides several advantages over known axial flow columns. First, when the radial flow column 2 of the present invention is scaled up for commercial use, the size of the column will be three to five times smaller, dependent upon the pollutant concentration, than an axial flow column having comparable throughput. Second, the radial flow column of the present invention provides better media characteristics including lower pressure drop and decreased channeling. Finally, the reduced bed volume size in a radial flow column means less media to purchase and to regenerate thus lowering installation and operating costs including a smaller regenerant volume.

2. Contaminant removing media

The radial flow column 2 of the present invention is preferably packed with the contaminant removing media 32 having a size in a range of 50–400 mesh and more preferably in a range of 150–400 mesh. As will be shown below, the size of the contaminant removing media 32 enhances the performance of the radial flow column 2 in an unexpected manner.

Typical contaminant removing media for axial flow columns is generally sized larger than 50 mesh. When smaller contaminant removing media is loaded into an axial column, the smaller media is more likely to be compressed which adversely affects the flow characteristics, particularly the pressure in the column. The radial flow column 2 of the present invention permits the use of smaller contaminant removing media since the pressure drops are smaller thereby reducing the likelihood of media compression and channeling.

One example of a contaminant removing media which may be used with the invention is a chelating ion exchange media. One such chelating ion exchange media is manufactured by Purolite of Bala Cynwyd, Pa., and sold under the name "PUROLITE." "PUROLITE 930" is an iminodiacetic substance which will chelate heavy metals by ion attraction to the dicarboxylic functionality and electron donation from nitrogen. The chelating ion exchange media, such as "PUROLITE 930," preferably has a macroporous structure. "PUROLITE 930" is commercially available in a size range of 25–50 mesh which is a size used in axial flow columns. Other companies such as the Rohm and Haas Company of Philadelphia, Pa., also manufacture and sell similar resins which may also be used.

"PUROLITE 930" reportedly ensures excellent ion diffusion so that all active sites, whether at the surface or in the interior of the media, are available for receiving a metallic ion. When an ion exchange occurs at the surface of the media, the metallic ion on the surface reportedly diffuses into the interior of the media so that active sites at the surface are free to react with another metallic ion. Thus, it would be expected that the static capacity of one gram of the chelating ion exchange media would be the same whether the media was a single, one-gram sphere or was composed of two half-gram spheres since the number of available reaction sites would be the same.

Figure 6:
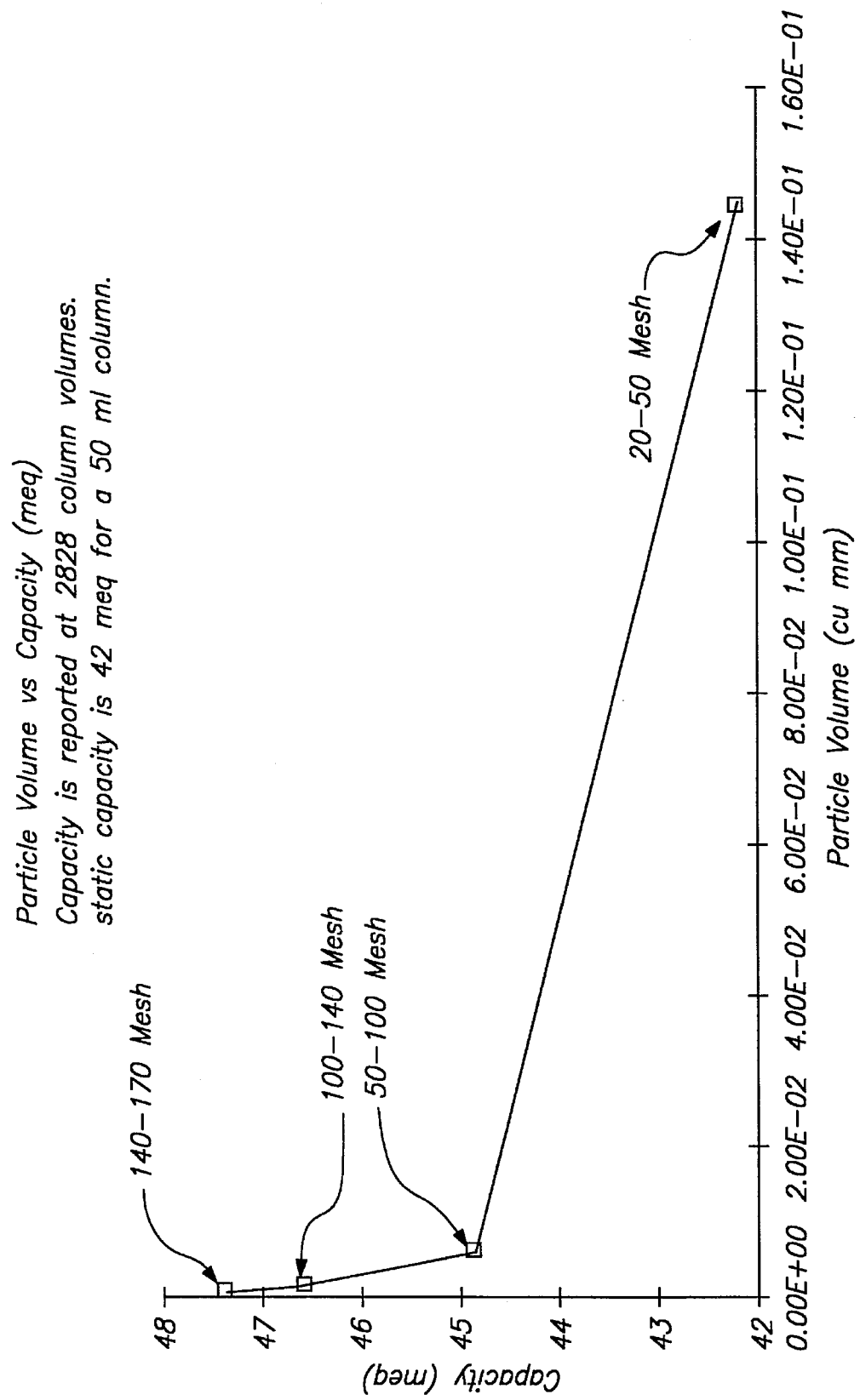
FIG. 6 is a graph of the static capacity of a chelating ion exchange media for various particle sizes.
Figure 7:
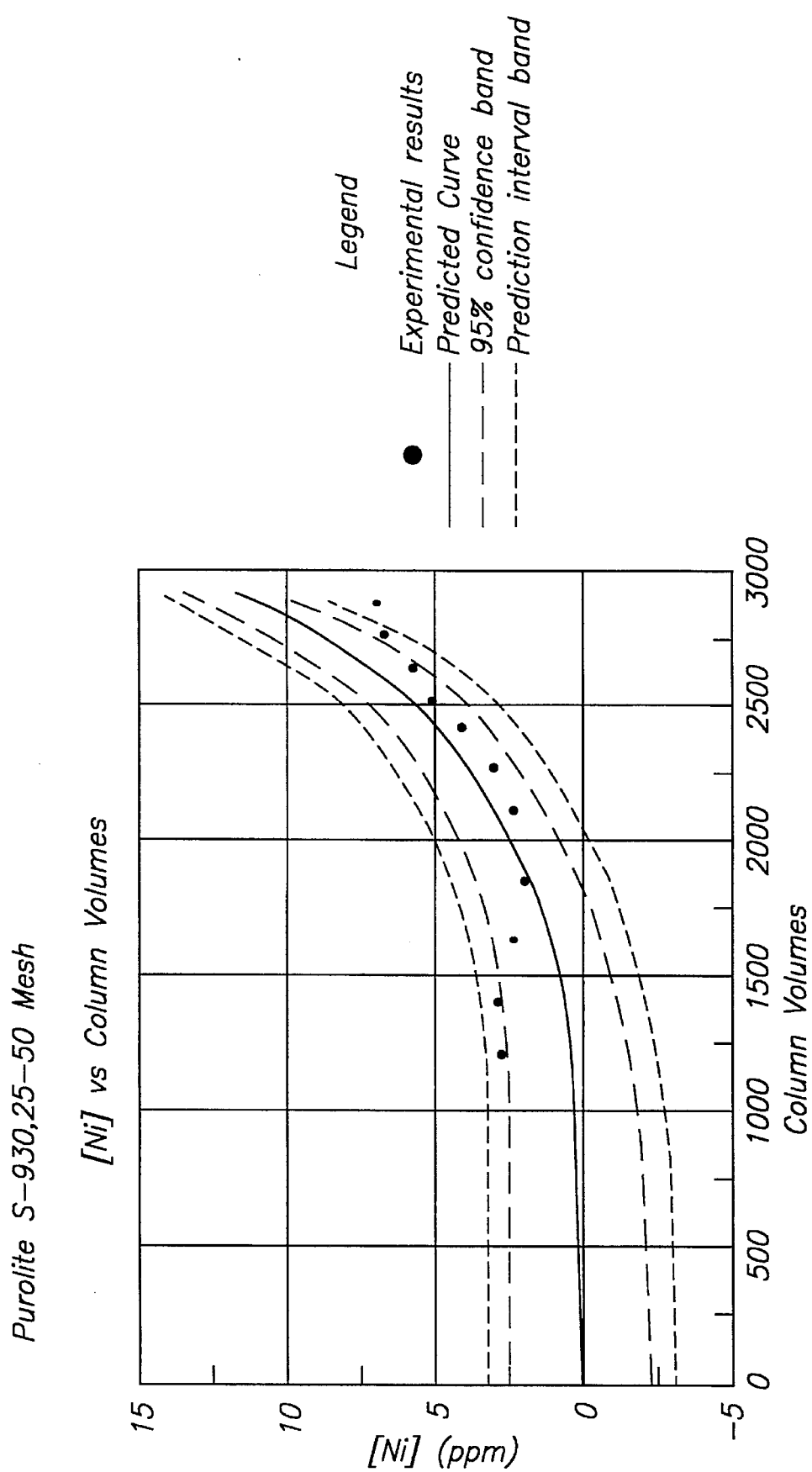
FIG. 7 is a graph of the dynamic performance of the chelating ion exchange media having a particle size of 25–50 mesh.
Figure 8:
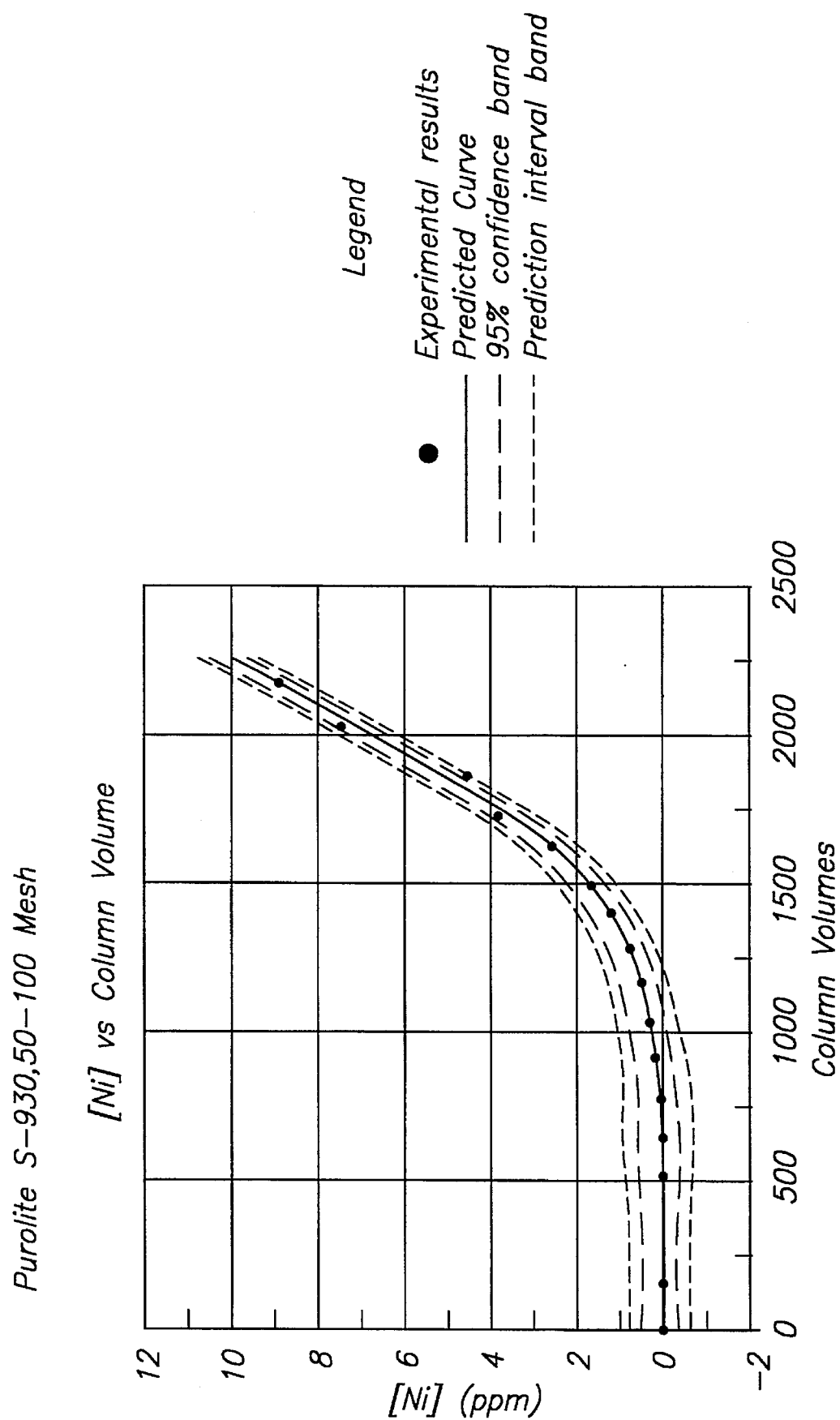
FIG. 8 is a graph of the dynamic performance of the chelating ion exchange media having a particle size of 50–100 mesh.
Figure 9:
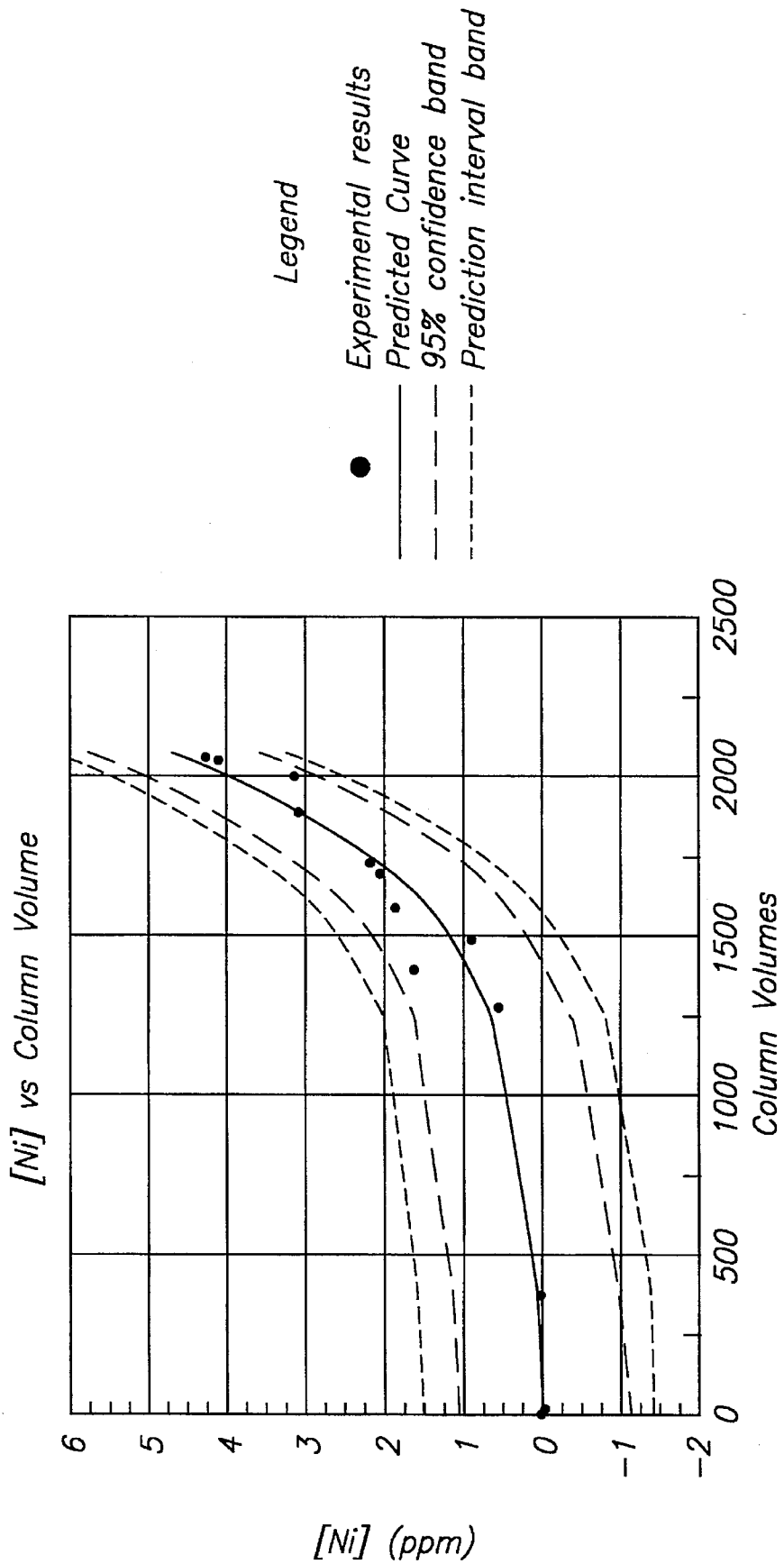
FIG. 9 is a graph of the dynamic performance of the chelating ion exchange media having a particle size of 100–140 mesh.
Figure 10:
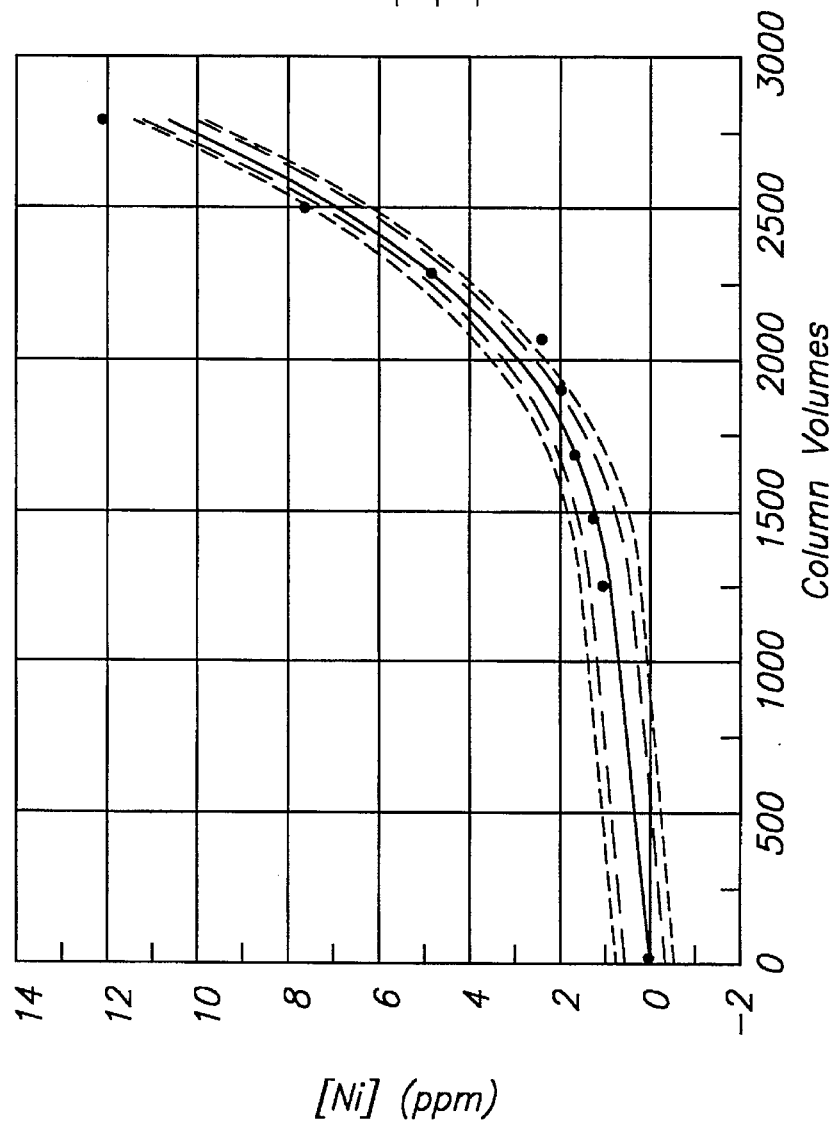
FIG. 10 is a graph of the dynamic performance of the chelating ion exchange media having a particle size of 140–170 mesh.

Tests indicate, however, that when the particle size of the chelating ion exchange media is reduced, the static capacity unexpectedly increases. Tests were performed for four size ranges; 25–50 mesh, 50–100 mesh, 100–140 mesh and 140–170 mesh. No macroscopic density change was observed between the various size ranges. FIG. 6 shows the results of static adsorption studies for the four size ranges of the chelating ion exchange media. The static tests were conducted by placing water having 12 ppm Ni in four containers each having one of the size ranges of the chelating ion exchange media. The test solutions were kept in the containers with the ion exchange media for over 18 hours at room temperature. The particle volume is expressed both in terms of $(mm)^3$ and in terms of mesh ranges. The static capacity of the media is expressed in terms of mass of Ni on the media per unit volume of the media.

As clearly indicated in FIG. 6, the static capacity of the media increases unexpectedly when the media size is reduced. It would be expected that the reported diffusion characteristics of the chelating ion exchange media would provide the same static capacity for the various size ranges, however, the static tests indicate otherwise.

Dynamic tests also indicate enhanced removal of contaminants when the particle size of the chelating ion exchange media is reduced. The dynamic tests were conducted by passing water having 12 or 13 ppm Ni through a 50 ml radial flow column at one column volume per minute. Referring to FIG. 7–10, the discharge concentration of Ni is plotted with respect to the number of column volumes processed. The predicted curve is a statistically generated best fit.

Figure 11:
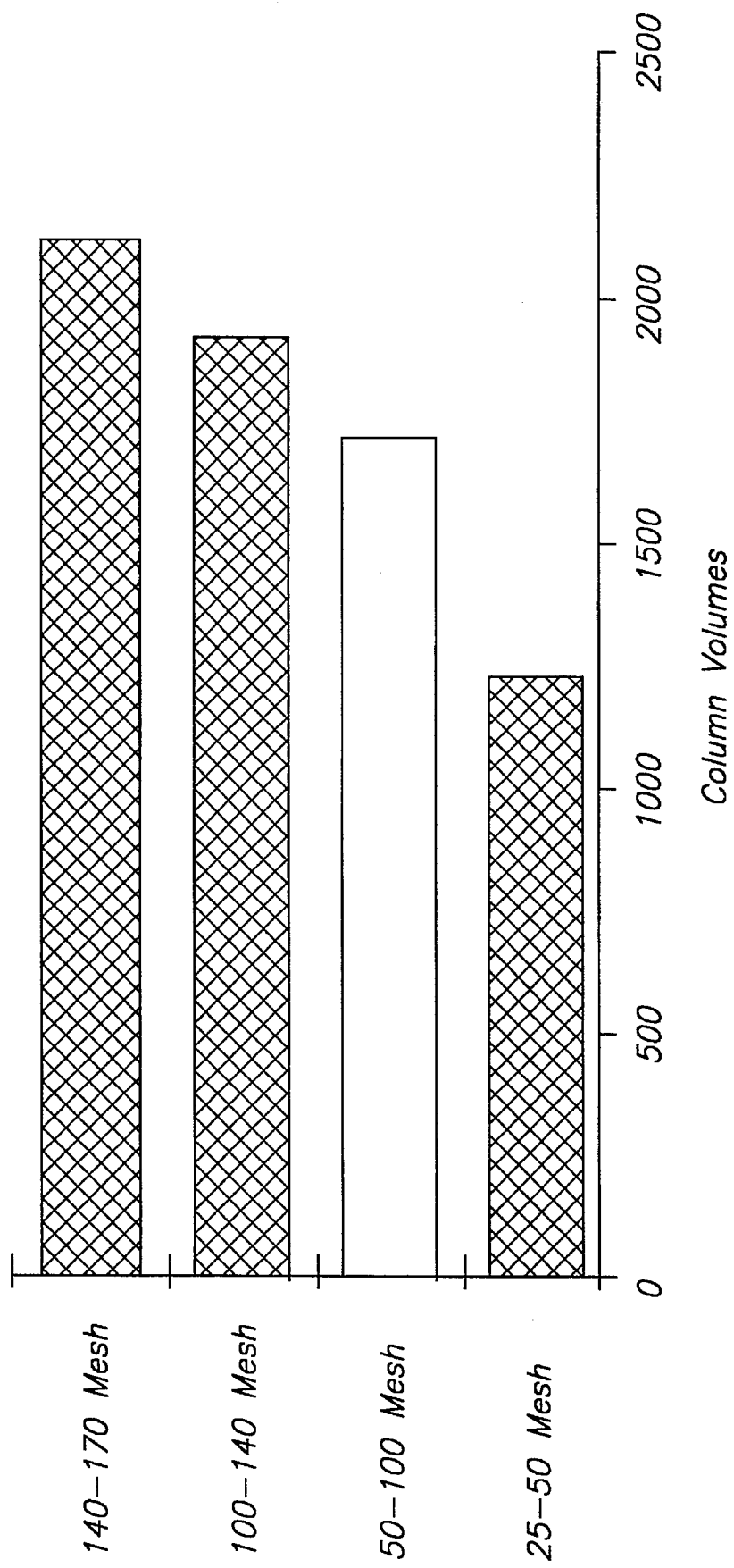
FIG. 11 is a graph comparing the column volumes processed until a 3.0 ppm breakthrough concentration in the dynamic performance tests.
Figure 12:
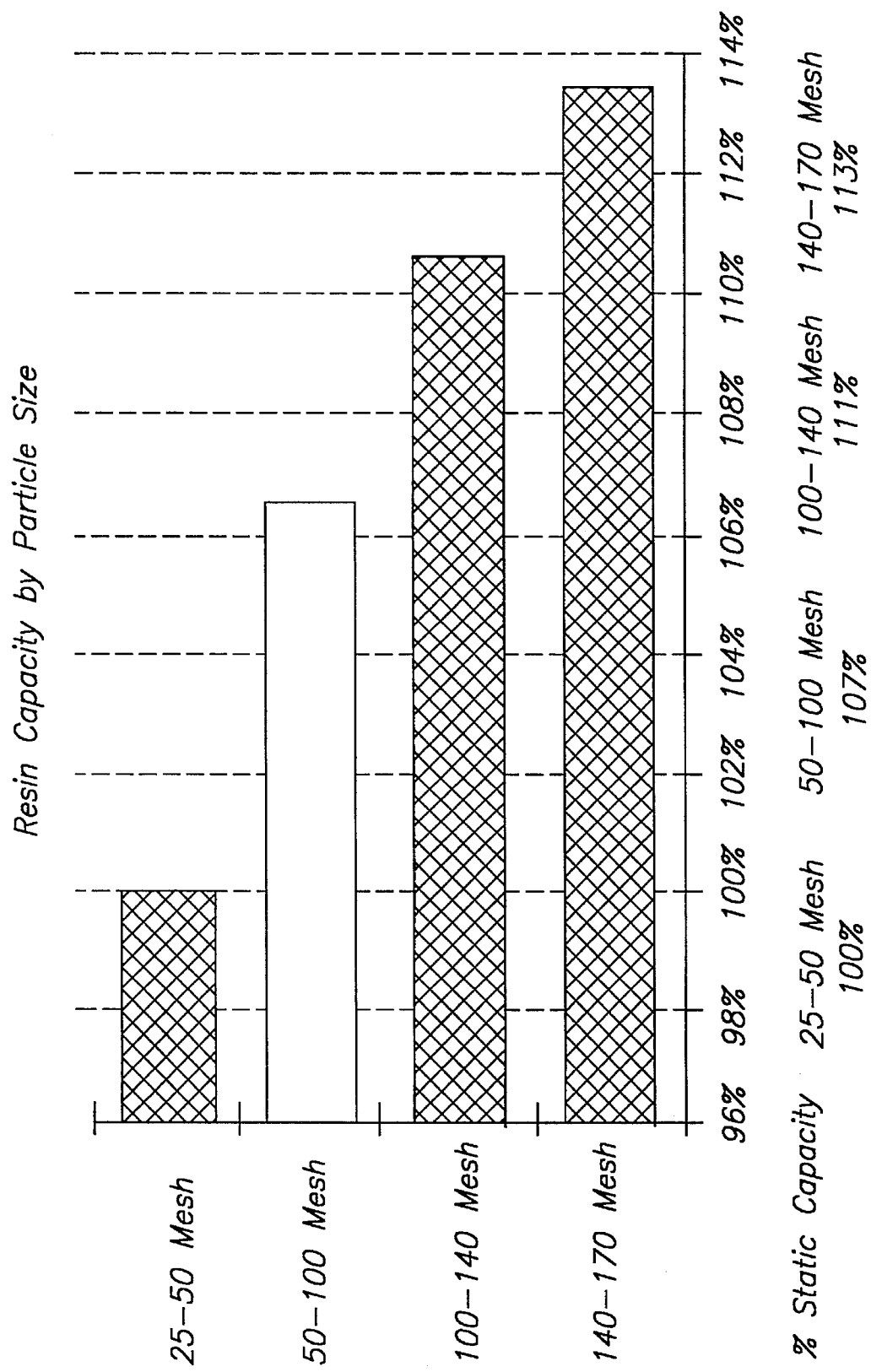
FIG. 12 is a graph comparing the amount of Ni on the chelating ion exchange resin until a 3.0 ppm breakthrough concentration in the dynamic performance tests.

Referring to FIGS. 11 and 12, the dynamic test results for the varying size ranges are plotted for comparison. Referring to FIG. 11, the number of column volumes processed when a 3.0 ppm Ni discharge is reached is shown for the various mesh size ranges. When the mesh size is reduced from 25–50 mesh to 50–100 mesh, the number of column volumes processed before a 3.0 ppm Ni breakthrough increases over 33%. Referring to FIG. 12, the amount of Ni on the media is also plotted when 3.0 ppm breakthrough was reached. The amount of Ni removed from the water is almost twice as high for the 140–170 mesh media as compared to the 25–50 mesh media.

As clearly indicated by the static and dynamic tests, the performance of the chelating ion exchange media is enhanced when the particle size is reduced. A conclusion which may be drawn from the test results is that the reported diffusion characteristics are not effective in transferring metallic ions to the interior of the particles after a 18 hour static test. Furthermore, the dynamic capacity of the ion exchange media was also enhanced when the particle size was reduced.

A further advantage of the reduced particle size is that less regenerating fluid is required to regenerate the media. After the chelating ion exchange media has been used for a period of time, the media can be regenerated by passing a suitable regenerating fluid through the radial flow column.

As demonstrated by the test results, when the radial flow column of the present invention is packed with contaminant removing media having the preferred size, the resulting system efficiently removes contaminants while avoiding the problems discussed previously concerning axial flow columns.

Additional experiments were conducted using bio-organic and synthetic media using a 1.5 liter and 0.05 liter radial flow column. In the following experiments, care was taken so that the column back pressure did not exceed 30 psi. The feed stocks were prepared using soluble inorganic substrates purchased from Aldrich Chemical Corporation. Feed materials were stirred using an air driven stirrer to insure homogeneity. Flow rates were measured using a Blue White, calibrated, 1.0 gpm flowmeter and checked periodically by timing the rate of filling a 1.0 liter graduated cylinder. Analysis of both the feed and the effluent were conducted at Romic's certified laboratory on a Thermo Jarrel Ash ICAP and a Bacharach trace mercury analyzer utilizing EPA specified digestion and stabilization methodology. All instruments were calibrated as required in EPA SW-846.

A five gallon feed mixture containing mercury, silver, cadmium, chromium and lead was prepared and pumped the through the 1.5 liter radial flow column. The contaminant removing media was peat moss, a bio-organic media which has shown good adsorptive properties but has not been able to be used in a column due to it's compressive nature. A flow rate of one column volume per minute was used. Samples of both the feed and the discharge were taken as a function of time. The results presented in Table I are indicative of the entire run with no breakthrough observed over the five gallon, 12.6 column volume experiment.

TABLE 1

Results of one column volume per minute study.

| metal ion | feed concentration | eluent concentration |
| --- | --- | --- |
| Hg | 4.2 ppm | not detected (<.1 ppm) |
| Ag | 3.3 | 0.1 ppm |
| Cd | 3.4 | not detected (<.1 ppm) |
| Cr | 2.4 | 2.2 ppm |
| Pb | 2.0 | not detected (<.1 ppm) |

In general, the results are very good with the exception of chromium. In a separate experiment, it was observed that raising the pH of the solution to 8.0, enhanced adsorption of chromium. This is speculated to be associated with the chromium species that is present at a pH of 8.50.

The experiments were scaled up to a 250-gallon feed mix and the number of metal ion types in the feed was increased. The flow rate was also varied to observe the kinetic aptitude of the media. Samples were acquired after running the column at the specified flow rate for 10 column volumes. These results are presented in Table 2.

TABLE 2

RESULTS OF TREATMENT WITH 1.5 LITER RADIAL FLOW COLUMN
CONCENTRATION (ppm)
effluent flow rate (ml/min)

| metal ion | feed | 1700 | 2400 | 3400 |
| --- | --- | --- | --- | --- |
| As | 4.2 ppm | 3.7 ppm | 3.7 ppm | 2.2 ppm |
| Hg | 1.0 | <0.1 | <0.1 | <0.1 |
| Se | 7.3 | 3.8 | 7.3 | 7.3 |
| Pb | 1.1 | <0.1 | <0.1 | <0.1 |
| Cd | 3.6 | 0.4 | 1.3 | 2.5 |

TABLE 2-continued

RESULTS OF TREATMENT WITH 1.5 LITER
RADIAL FLOW COLUMN
CONCENTRATION (ppm)
effluent flow rate (ml/min)

| metal ion | feed | 1700 | 2400 | 3400 |
|---|---|---|---|---|
| Cr | 2.2 | 0.2 | 0.4 | 0.5 |
| Ag | 0.8 | 0.1 | 0.2 | 0.2 |

Finally, the capacity of the media was examined by using a 250 gallon feed mixture and periodically taking samples. The results in Table 3 are of samples taken after 750 column volumes, (1,125 liters). Flow rates were maintained at 1 column volume per minute.

TABLE 3

| metal ion | feed concentration | eluent concentration |
|---|---|---|
| Cr | 20.6 ppm | 8.7 ppm |
| Pb | 20.8 | <0.1 |
| Ag | 8.3 | <0.1 |

To further understand the radial flow column and the peat moss media, separate experiments were conducted on a single metal species, namely, lead. In these experiments, a 50-mL radial flow column was used and packed with peat moss. A 250-gallon polyethylene container was used to contain the feedstock material. The results of these experiments follow.

TABLE 4

Removal of lead from an aqueous waste stream at
1.0 column volumes per minute

| FEED | CONCENTRATION (ppm) EFFLUENT | COLUMN VOLUMES (total) TREATED |
|---|---|---|
| 7.0 | below 0.1 | 1800 before breakthrough |

This yields a calculated capacity of 12.6 milligrams of lead per milliliter of peat moss in the column.

Next, a commercially available resin, AGMP-1, at a particle size of 200–400 mesh, was packed in the column and a 200 gallon feed solution of 12 parts per million of selenious acid was prepared. AGPM-1 is an anionic resin from Bio-Rad Laboratories of Richmond, Calif. The column flow rate was set to one column volume per minute, (50 mL/minute). The results of this study are presented in Table 5.

TABLE 5

Removal of Selenium from an
aqueous waste stream

| FEED | EFFLUENT | COLUMN VOLUMES (total) TREATED |
|---|---|---|
| 12 ppm | below 0.1 | 1710 |

At 1800 column volumes, breakthrough to a selenium concentration of 1.3 ppm was observed. The column was then stripped with a solution of hydrochloric acid followed by dilute sodium hydroxide to produce the sodium salt. The eluent from stripping was tested for selenium which showed a concentration of 1,740 ppm. This equates to 98% regeneration and recovery.

Application of this technology to nickel and copper waste streams using another commercially available resin, "PUROLITE S-930," was also evaluated. Utilizing this chelating resin, which had been milled to a particle size of 200 mesh, produced the following results:

TABLE 6

Removal of Nickel and Copper from
an actual plating rinsate

| FEED | EFFLUENT | COLUMN VOLUMES (total) TREATED |
|---|---|---|
| Ni 14.6 ppm | 30.1 ppb | 2400 |
| Cu 12.0 | 9.8 ppb | 2400 |

These results were obtained following the same methodology as before, that is, a flow rate of 1 column volume per minute, using a 50-mL column. The feed was obtained from a rinse tank of a computer manufacturer.

Modification and variation can be made to the disclosed embodiments without departing from the subject of the invention as defined by the following claims. For example, the flow through the radial flow column 2 may be from inner screen 24 toward the outer screen 26, the inlet 4 may be positioned at the bottom of the column and the source of contaminated water may be from a groundwater pump discharge or industrial effluent discharge rather than a tank.

What is claimed is:

1. A method for treating water to remove contaminants therefrom, comprising the steps of:

providing a fluid chamber, a substantially cylindrical inner screen, and a substantially cylindrical enter screen surrounding the inner screen, the fluid chamber having an inlet, an outlet, and a sidewall, the inner and outer screens being positioned in the fluid chamber, the inner screen being spaced apart from the outer screen and defining a single compartment for holding a media bed therebetween and interposing a distribution plate between said inlet and a feed channel formed between said sidewall and said outer screen in said fluid chamber whereby said water to be treated will be substantially distributed equally around said outer screen;

coupling the inlet to a source of contaminated water containing dissolved contaminants including heavy metals;

filling the compartment with a contaminant removing media capable of removing said dissolved contaminants including heavy metals; and flowing the contaminated water through the inlet, through the distribution plate and through said outer screen, through the contaminant removing media where said dissolved contaminants in the contaminated water are removed, through said inner screen, and out the outlet.

2. The method of treating water of claim 1, wherein:

the filling step is carried out with the contaminant removing media having a size in a range of about 50–400 mesh.

3. The method of treating water of claim 2, wherein:

the filling step is carried out with the size range of the contaminant removing media being about 200–400 mesh.

4. The method of treating water of claim 1, wherein:

the filling step is carried out with the contaminant removing media being an ion exchange media.

5. The method of treating water of claim 4, wherein:

the filling step is carried out with the ion exchange media being a chelating ion exchange media.

6. The method of treating water of claim 1, further comprising the step of:

regenerating the contaminant removing media by flowing a regenerating fluid through the contaminant removing media after the flowing step.

7. The method of treating water of claim 1, wherein:

the flowing step is carried out with the contaminated water being ground water.

8. The method of treating water of claim 1, wherein:

the flowing step is carried out with the contaminated water being an industrial effluent.

9. The method of treating water claim 1, wherein:

the providing step is carried out with the inner and outer screens having a common longitudinal axis, the inner and outer screens each having a plurality of members extending in a direction substantially parallel to the longitudinal axis, the plurality of members having a generally triangular cross-sectional shape in a plane transverse to the longitudinal axis, adjacent members having a radially-outward separation and a radially-inward separation, the radially-inward separation being larger than the radially-outward separation.

10. The method of claim 9 wherein:

the providing step is carried out with the radially-outward separation being between 150 mesh and 200 mesh.

11. The method of claim 1, wherein:

the flowing step is carried out with the contaminated water having a contaminant concentration of less than 10,000 ppm.

12. The method of claim 11, wherein:

the flowing step is carried out with the contaminated water having a contaminant concentration of less than 1,000 ppm.

13. A method for treating water flow to remove contaminants therefrom, comprising the steps of:

providing a fluid chamber, a substantially cylindrical inner screen, and a substantially cylindrical outer screen surrounding the inner screen, the fluid chamber having an inlet, an outlet, and a sidewall, the inner screen being spaced apart from the outer screen and defining a compartment for holding a media bed therebetween and interposing a distribution means in said fluid chamber for substantially equally distributing the water to be treated against one of said screens;

coupling the inlet to a source of contaminated water containing dissolved contaminants including heavy metals:

filling the compartment with a contaminant removing media capable of removing the dissolved contaminants including heavy metal ions, said contaminant removing media having a size in a range of 50–400 mesh, the contaminant removing media being selected from the group consisting of ion exchange media, peat moss, algae, redwood bark, cationic, anionic and chelating resins, adsorbents, absorbents and polymeric agents; and flowing the contaminated water flow through the inlet, through the distribution means, through the contaminant removing media, and out the outlet.

14. The method of treating water of claim 13, wherein:

The providing step is carried out with the inner and outer screens having a common longitudinal axis, the inner and outer screens each having a plurality of members extending in a direction substantially parallel to the longitudinal axis, the plurality of members having a generally triangular cross-sectional shape in a plane transverse to the longitudinal axis, adjacent members having a radially-outward separation and a radially-inward separation, the radially-inward separation being larger than the radially-outward separation.

15. The method of treating water of claim 14, wherein the flowing step is carried out with the contaminated water being an industrial effluent which includes dissolved inorganic contaminants.

16. The method of claim 14, wherein the flowing step is carried out with the contaminated water having a concentration of dissolved contaminants of less than 10,000 ppm.

17. The method of claim 14, wherein the flowing step is carried out with the contaminated water having a concentration of dissolved contaminants of less than 1,000 ppm.

18. The method of treating water of claim 13, wherein said distribution means is a distribution plate having a plurality of apertures, the plate mounted transverse with the longitudinal axis of said chamber and above said media bed, for evenly distributing said contaminated water between said sidewalls of said chamber and said outer screen.

19. A method for treating water to remove contaminants therefrom, comprising the steps of:

providing a fluid chamber having an inlet, an outlet and a sidewall, a substantially cylindrical inner screen, and a substantially cylindrical outer screen surrounding the inner screen, the inner and outer screens having a common longitudinal axis and a plurality of members extending in a direction substantially parallel to the longitudinal axis, the plurality of members having a generally triangular cross-sectional shape in a plane transverse to the longitudinal axis, adjacent members having a radially-outward separation and a radially-inward separation, the radially-inward separation being larger than the radially-outward separation, the inner and outer screens being positioned in the fluid chamber, the inner screen being spaced apart from the outer screen and defining a compartment for holding a media bed therebetween;

coupling the inlet to a source of contaminated water;

filling the compartment with a contaminant removing media; and flowing the contaminated water through the inlet, through one of said inner and outer screens, through the contaminant removing media where contaminants in the contaminated water are removed, and through the other of said inner and outer screens, and out the outlet.

20. The method of treating water of claim 19, wherein the filling step is carried out with the contaminant removing media having a size in a range of about 50–400 mesh.

21. The method of treating water of claim 19, wherein the filling step is carried out with the size range of the contaminant removing media being about 200–400 mesh.

22. The method of treating water of claim 19, wherein the filling step is carried out with the contaminant removing media being an ion exchange media.

23. The method of treating water of claim 22, wherein the filling step is carried out with the ion exchange media being a chelated ion exchange media.

24. The method of treating water of claim 19, further comprising the step of:

regenerating the contaminant removing media by flowing a regenerating fluid through the contaminant removing media after the flowing step.

25. The method of treating water of claim 19 wherein the contaminated water contains dissolved inorganic contaminants.

26. The method of treating water of claim 25 wherein the dissolved inorganic contaminants include heavy metal ions.

27. The method of treating water of claim 19 wherein the contaminated water is flowed through the inlet, through the outer screen, through the contaminant removing media, through the inner screen, and out the outlet.

* * * * *